United States Patent [19]

Knoerzer

[11] Patent Number: 5,230,963

[45] Date of Patent: Jul. 27, 1993

[54] OXYGEN AND WATER VAPOR TRANSMISSION RESISTANT FILM AND METHOD

[75] Inventor: Anthony R. Knoerzer, Fairport, N.Y.

[73] Assignee: Mobil Oil Corporation, Fairfax, Va.

[21] Appl. No.: 811,354

[22] Filed: Dec. 20, 1991

[51] Int. Cl.⁵ .............................................. B32B 27/08
[52] U.S. Cl. .................................... 428/520; 428/516; 428/910
[58] Field of Search ................ 428/516, 523, 520, 910

[56] References Cited

U.S. PATENT DOCUMENTS

| | | | |
|---|---|---|---|
| 3,480,580 | 11/1969 | Joyner et al. | 260/29.6 |
| 4,621,014 | 11/1986 | Lu | 428/516 |
| 4,650,721 | 3/1987 | Ashcraft | 428/516 |

*Primary Examiner*—Edith Buffalow
*Attorney, Agent, or Firm*—A. J. McKillop; G. W. Hager; J. P. O'Sullivan

[57] ABSTRACT

A multilayer film combination has a pair of base layers each of a blend of polypropylene and maleated polypropylene, each is machine direction oriented before receiving a coating of PVOH containing a cross-linking agent and each is mated with the PVOH coatings together before the combination is transverse direction oriented.

1 Claim, No Drawings

OXYGEN AND WATER VAPOR TRANSMISSION RESISTANT FILM AND METHOD

BACKGROUND OF THE INVENTION

This invention relates to a flexible multi-layer film having high barrier resistance to the transmission of oxygen and water vapor.

In applicants copending application Ser. No. 07/627,113 filed Dec. 13, 1990 there is disclosed a film combination comprising a pair of polymeric substrate films that have been surface treated to about 35 dynes/cm and wherein each surface included a primer coating thereon and in turn each primer coating carried a layer of poly(vinyl alcohol) containing cross-linking means. The films were positioned in relation to each other so that the poly(vinyl alcohol) layers were an intimate contacting relationship before any substantial cross-linking occurred.

It is an object of the present invention to present a film and process which results in a similar film structure but which does not require surface treatment of the base film and does not require the presence of a primer coating on the base substrate.

SUMMARY OF THE INVENTION

The present invention relates to a process for forming a firmly bonded film combination comprising:

(a) preparing an intimate blend of polypropylene and a maleic acid anhydride modified polypropylene and forming a cast layer thereof;

(b) forming said cast layer into a machine direction oriented film;

(c) applying a coating of poly(vinyl alcohol) containing cross-linking means to the machine direction oriented film;

(d) mating a second so-coated machine direction oriented film so that poly(vinyl alcohol) surfaces are in contact;

(e) transverse direction orienting the mated films to form a film combination of high delamination resistance.

The invention is also concerned with a film combination comprising:

(a) a pair of films each comprised of an intimate blend of polypropylene and a maleic acid anhydride modified polypropylene;

(b) coatings of poly(vinyl alcohol) containing cross-linking means having been applied to a surface of each of said pair while said pair had been in a machine direction orientation condition; and (c) each coated film having been positioned with the poly(vinyl alcohol) layers in intimate contacting relationship while said coated contacting films had been transverse direction oriented.

DETAILED DESCRIPTION OF THE INVENTION

The prior art method of increasing the oxygen content of polypropylene films was believed to be an increase in the number of carbonyl groups on the surface of the polypropylene through, for example, flame or corona discharged treatment of the films' surface thereby increasing the wetting and adhesion coatings thereafter applied to the base polyolefin film.

The substrate of the present invention utilize, in a similar manner, the tendency of the oxygen in carbonyl groups to hydrogen bond. By artificially adding carbonyl containing material to the film, i.e., compounding with maleated polyolefins, the bulk hydrogen bonding character is effectively increased over that of corona discharged treated films. By this technique, it is believed that corona discharge treatment and a separate primer coating is eliminated.

It is proposed, therefore, to use maleic anhydride modified polypropylene resins as a source of additional carbonyl groups. It is believed that the double carbonyl on each maleic anhydride group can contribute two hydrogen bonds. When compounded with polypropylene homopolymer these groups add to the adhesion effect in cooperation with the poly(vinyl alcohol).

This invention encompasses polypropylene substrates comprising a major amount (90-99 wt %) of a polypropylene resin as described herein, compounded with or modified by a minor amount (1-10 wt %) based on the weight of the polypropylene resin of a maleated polypropylene.

Any conventional base polypropylene resin prepared in any suitable manner may be used in this invention. However, especially preferred are essentially isotactic crystalline polypropylene resins which exhibit the following general properties:

Metal flow index: 0.5-12;
Crystalline melting point ° F.: 305-340;
Inherent viscosity: 1.4-4.0;
Molecular weight (wt. av.): 100,000-600,000;
Density (gm/cc): 0.89-0.91

The maleated polypropylene additive may be derived from maleic acid or its anhydride, copolymerized with polypropylene. Pertinent properties of maleated polypropylene marketed by Eastman Chemical are as follows:

Ring and Ball softening 157° C.;
M.W. 4500;
Density ° C. 0.934;
Acid Number 45;
Brookfield Visc. 190° C.cp/370
Color Gardner Scale 11;
Penetration Hardness, 100 gm/5 sec./25° C. tenths of mm.0-1.

In addition, the term maleic anhydride modified polypropylene homopolymer is the product resulting from the reaction between maleic anhydride and the thermal degradation product of polypropylene. Examples of this material can be found disclosed in U.S. Pat. No. 3,480,580 issued Nov. 25, 1989, the disclosure of which is incorporated herein by reference in its entirety.

The poly(vinyl alcohol) employed herein can be any commercially available material, e.g., ELVANOL 71-30, an E. I. duPont product. The poly(vinyl alcohol) coating solution is prepared by dissolving the polymer in hot water, cooling and mixing both with a suitable cross-linking agent and an acid catalyst. The cross-linking agent can be a melamine or urea-formaldehyde resin. Commercially available cross-linkers also would include PAREZ 613, a methylated melamine formaldehyde; CYMEL 373, a methylated melamine formaldehyde; CYMEL 401, a trimethylol melamine urea formaldehyde; glyoxal, borax, etc. An acid catalyst, e.g., ammonium sulfate, ammonium chloride, sulfuric acid, nitric acid and ammonium nitrate, etc. will effectively catalyze the systems.

Cross-linking is carried out not only to make the poly(vinyl alcohol) less $O_2$ transmissive and less moisture sensitive but, as has been discovered, to effect an unexpectedly strong bond between the two contacting PVOH layers. It is essential that significant cross-linking not occur before the two poly(vinyl alcohol) layers are brought into contact. This is effected by making up the aqueous solution so that the initial concentration is too low for this to occur but, as drying occurs, the concentration increases and the rate of cross-linking is heightened. This provides adequate time to bring the surfaces together. This is done by using separately formed layered structures or by folding over a single structure to bring the PVOH surfaces together followed by edge trimming.

Suitable concentrations have been found to be from 1 to 10, preferably from 4 to 8 wt % of the solution being polymer plus cross-linking agent plus catalyst. If the solids content is higher, the solution becomes too viscous; if lower, good water resistance is not obtained. From about 5% to 30%, typically 15% cross-linking agent is used with from 0% to 7.5%, typically 2% of the acid catalyst. A preferred formulation comprises the following solids content: 85.5 wt % poly(vinyl alcohol); 12.8 wt % methylated melamine formaldehyde; and 1.7 wt % ammonium chloride.

The aqueous poly(vinyl alcohol) solution was prepared by dissolving sufficient ELVANOL 71–30 in hot water to form an 8 wt % solution which was then cooled. To this solution was added a 20 wt % aqueous melamine formaldehyde solution and a 5 wt % aqueous ammonium chloride solution to provide the preferred formulation recited above. The cross-linked poly(vinyl alcohol) can be present in from about 0.2 to 3 g/m$^2$.

A film that can provide high oxygen and moisture barrier resistance is illustrated by the following Example:

EXAMPLE

An intimate blend of polypropylene (95 wt %) and maleated polypropylene (5 wt %) was prepared and formed into a cast layer of approximately 35 mls thick. This cast layer was then machine direction oriented to a thickness of about 1 ml thick. A coating of the above-identified poly(vinyl alcohol) was applied to one surface each of a pair of the machine direction oriented polypropylene films. The poly(vinyl alcohol) coating contained 2.5 phr of ammonium chloride and 20 phr of Parez 613 malemine formaldehyde. The so-coated substrate films were mated together so that the poly(vinyl alcohol) layers were in contact. This was accomplished by running the film through rollers at room temperature. The film traveled at approximately 50 fpm and was subjected to a pressure of 90 psi. Thereafter the film combination was heated to 160° C. and transverse direction oriented. The finished film had been machine direction oriented 7 times and transverse direction oriented 5 times.

The resulting laminated film strongly resisted delamination and was highly resistant to the transmission of oxygen and water vapor during a 24 hr. period.

It is to be understood that instead of bringing together 2 separately formed coated machine direction oriented films a single poly(vinyl alcohol) coated film can be folded on itself so that the poly(vinyl alcohol) faces are in contact and, after edge trimming, the film can be pressure laminated to itself, heated and transverse direction oriented before final windup for shipment to a converter.

It is to be understood that the outer surfaces of the completed lamination can have applied thereto any conventional coatings, such as, heat seal layers, etc.

Although the present invention has been described with preferred embodiments, it is to be understood that modifications and variations may be resorted to, without departing from the spirit and scope of this invention. As those skilled in the art will readily understand such variations and modifications are considered to be within the purview and scope of the appended claims.

What is claimed is:

1. A film combination comprising (a) a pair of films each comprised of an intimate blend of polypropylene and a maleic acid anhydride modified polypropylene, (b) coatings of poly(vinyl alcohol) containing cross-linking means having been applied to a surface of each of said pair while said pair had been in a machine direction orientation condition and (c); each coated film having been positioned with the poly(vinyl alcohol) layers in intimate contacting relationship while said coated contacting films had been transverse direction oriented.

* * * * *